US008712653B2

(12) United States Patent
Schwalm et al.

(10) Patent No.: US 8,712,653 B2
(45) Date of Patent: Apr. 29, 2014

(54) DECELERATION DEPENDENT SHIFT CONTROL

(75) Inventors: Jayson S. Schwalm, Farmington Hills, MI (US); David W. Wright, Howell, MI (US); Christopher A. Spangler, Shanghai (CN); Andriy Nikitin, Hartland, MI (US)

(73) Assignee: GM Global Technology Operations LLC

( * ) Notice: Subject to any disclaimer, the term of this patent is extended or adjusted under 35 U.S.C. 154(b) by 2251 days.

(21) Appl. No.: 11/740,078

(22) Filed: Apr. 25, 2007

(65) Prior Publication Data

US 2008/0046157 A1 Feb. 21, 2008

Related U.S. Application Data

(60) Provisional application No. 60/815,147, filed on Jun. 20, 2006.

(51) Int. Cl.
*G06F 7/00* (2006.01)

(52) U.S. Cl.
USPC .................................................. 701/55

(58) Field of Classification Search
USPC .............................. 701/51, 55, 56
See application file for complete search history.

(56) References Cited

U.S. PATENT DOCUMENTS

| 5,077,672 | A | * | 12/1991 | Nobumoto et al. | 701/92 |
|---|---|---|---|---|---|
| 5,123,301 | A | * | 6/1992 | Hagele et al. | 477/121 |
| 5,129,288 | A | * | 7/1992 | Sasaki et al. | 477/120 |
| 5,226,351 | A | * | 7/1993 | Matsuoka et al. | 477/32 |
| 5,251,512 | A | * | 10/1993 | Koenig et al. | 477/120 |
| 5,262,952 | A | * | 11/1993 | Tsuyama et al. | 701/87 |
| 5,462,500 | A | * | 10/1995 | Benford et al. | 477/154 |
| 5,618,243 | A | * | 4/1997 | Kondo et al. | 477/118 |
| 5,655,990 | A | * | 8/1997 | Ooyama et al. | 477/15 |
| 5,728,026 | A | * | 3/1998 | Sakaguchi et al. | 477/110 |
| 5,954,776 | A | * | 9/1999 | Saito et al. | 701/51 |
| 6,019,701 | A | * | 2/2000 | Mori et al. | 477/46 |
| 6,058,346 | A | * | 5/2000 | Wachi et al. | 701/55 |
| 6,231,477 | B1 | * | 5/2001 | Hollingsworth et al. | 477/107 |
| 6,244,986 | B1 | * | 6/2001 | Mori et al. | 477/46 |
| 6,295,498 | B1 | * | 9/2001 | Gleason et al. | 701/55 |
| 6,327,529 | B1 | * | 12/2001 | Ore | 701/55 |
| 6,389,346 | B1 | * | 5/2002 | Gianoglio et al. | 701/51 |
| 6,411,878 | B2 | * | 6/2002 | Hanawa et al. | 701/51 |
| 6,450,919 | B2 | * | 9/2002 | Kusafuka et al. | 477/115 |
| 6,467,786 | B2 | * | 10/2002 | Horiuchi | 280/260 |
| 6,487,485 | B1 | * | 11/2002 | Henneken et al. | 701/56 |
| 6,516,261 | B2 | * | 2/2003 | Ohashi et al. | 701/51 |

(Continued)

FOREIGN PATENT DOCUMENTS

| DE | 2902632 C2 | 5/1990 |
|---|---|---|
| DE | 4216553 A1 | 11/1992 |

(Continued)

*Primary Examiner* — Thomas Black
*Assistant Examiner* — Sze-Hon Kong

(57) ABSTRACT

A transmission control system for regulating operation of an automatic transmission of a vehicle includes a first module that provides a predetermined shift schedule including upshift and downshift lines and a second module that offsets each of the upshift and downshift lines by an offset amount to provide modified upshift and downshift lines when a deceleration of the vehicle exceeds a threshold deceleration. A third module regulates operation of the automatic transmission based on the modified upshift and downshift lines.

20 Claims, 7 Drawing Sheets

(56) References Cited

U.S. PATENT DOCUMENTS

| | | | |
|---|---|---|---|
| 6,519,520 B2* | 2/2003 | Shin | 701/55 |
| 6,671,601 B2* | 12/2003 | Abiru | 701/51 |
| 7,011,602 B2* | 3/2006 | Makiyama et al. | 477/44 |
| 7,021,050 B2* | 4/2006 | Nishimura et al. | 60/295 |
| 7,160,227 B2* | 1/2007 | Kuwahara et al. | 477/116 |
| 7,532,968 B2* | 5/2009 | Kadota | 701/55 |
| 7,610,137 B2* | 10/2009 | Kwon | 701/51 |
| 7,627,411 B2* | 12/2009 | Kuwahara et al. | 701/55 |
| 7,695,404 B2* | 4/2010 | Saitoh et al. | 477/92 |
| 2001/0032044 A1* | 10/2001 | Hanawa et al. | 701/51 |
| 2002/0082760 A1* | 6/2002 | Katakura et al. | 701/54 |
| 2004/0020194 A1* | 2/2004 | Nishimura et al. | 60/297 |
| 2004/0097328 A1* | 5/2004 | Makiyama et al. | 477/43 |
| 2006/0014606 A1* | 1/2006 | Sporl et al. | 477/42 |
| 2006/0089775 A1* | 4/2006 | Whitton et al. | 701/51 |

FOREIGN PATENT DOCUMENTS

| | | | |
|---|---|---|---|
| DE | 10315889 A1 | 11/2004 | |
| EP | 419402 A1 * | 3/1991 | F02C 9/28 |
| EP | 0888921 A2 | 1/1999 | |
| GB | 2294302 A * | 4/1996 | F16H 61/04 |

* cited by examiner

DECELERATION DEPENDENT SHIFT CONTROL

CROSS-REFERENCE TO RELATED APPLICATIONS

This application claims the benefit of U.S. Provisional Application No. 60/815,147, filed on Jun. 20, 2006. The disclosure of the above application is incorporated herein by reference.

FIELD

The present disclosure relates to a powertrain having an automatic transmission driven by an internal combustion engine through a torque converter, and more particularly to a deceleration dependent shift control for an automatic transmission.

BACKGROUND

The statements in this section merely provide background information related to the present disclosure and may not constitute prior art.

Vehicle powertrains typically include a prime mover, such as an internal combustions engine, that drives a transmission through a coupling device. In some cases, the transmission includes an automatic transmission that is driven by the prime mover through a torque converter. The transmission multiplies the engine drive torque by a desired gear ratio and transfers the multiplied drive torque to a driveline to propel the vehicle.

A control module regulates operation of the transmission based upon vehicle operating parameters including, but not limited to, vehicle speed and throttle position. More specifically, the control module includes predetermined shift lines that are used to command upshift and downshifts.

In some instances, the vehicle is rapidly decelerated, for example, to avoid a collision or to otherwise come to a rapid stop. As the vehicle decelerates, several events can simultaneously occur including, but not limited to, suspension movement, axle wind-up and a transmission downshift. Under certain conditions, a transmission downshift can result in undesired driveline disturbances in the form of noise (e.g., an audible clunk) and/or driveline oscillations.

SUMMARY

Accordingly, the present invention provides a transmission control system for regulating operation of an automatic transmission of a vehicle. The transmission control system includes a first module that provides a predetermined shift schedule including upshift and downshift lines and a second module that offsets each of the upshift and downshift lines by an offset amount to provide modified upshift and downshift lines when a deceleration of the vehicle exceeds a threshold deceleration. A third module regulates operation of the automatic transmission based on the modified upshift and downshift lines.

In one feature, the transmission control system further includes a fourth module that determines the offset amount based on at least one of a current gear ratio of the automatic transmission and the deceleration.

In another feature, the offset amount is a fixed, predetermined amount.

In another feature, the second module stores a base downshift line vehicle speed, and sets the offset amount to zero when a current vehicle speed falls below the base downshift line vehicle speed.

In another feature, the second module initiates a timer upon executing the step of offsetting, and sets the offset amount to zero when the timer achieves a threshold time.

In still another feature, the second module sets the offset amount to zero when a throttle position exceeds a threshold throttle position.

In yet other features, the second module monitors a vehicle speed, and decays the offset amount towards zero when the vehicle speed accelerates back through the upshift lines. The second module decays the offset amount based on a decay rate. The decay rate is a predetermined, fixed value. Alternatively, the decay rate is determined based on an acceleration of the vehicle.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
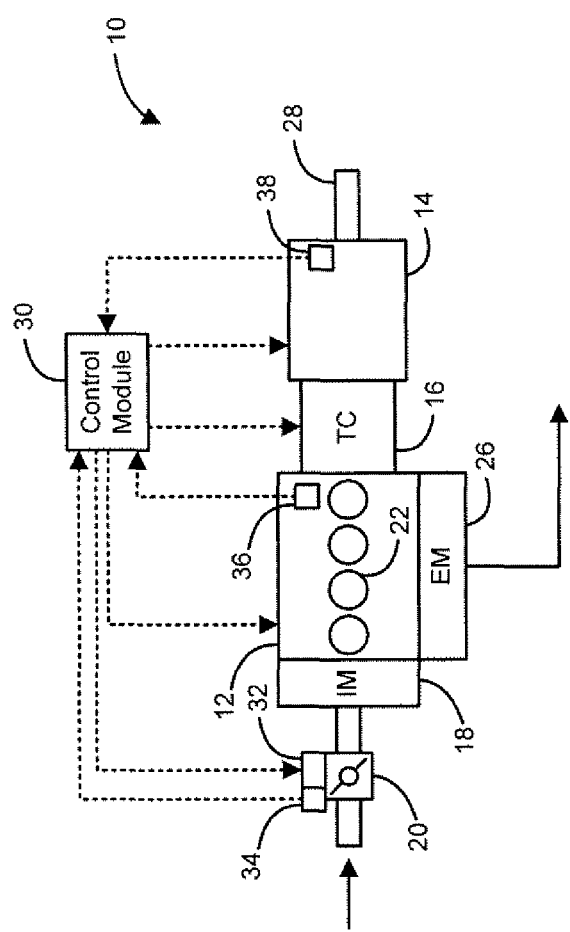
FIG. 1 is a functional block diagram of an exemplary vehicle powertrain that is regulated based on the deceleration dependent shift control of the present invention.

The following description of the preferred embodiment is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Referring now to FIG. 1, an exemplary powertrain 10 is illustrated and includes an engine 12 that drives a transmission 14 through a torque converter 16. More specifically, air is drawn into an intake manifold 18 of the engine 12 through a throttle 20. The air is mixed with fuel and the air/fuel mixture is combusted within cylinders 22 to reciprocally drive pistons (not shown) within the cylinders 22. The pistons rotatably drive a crankshaft (not shown) to provide drive torque. Exhaust generated by the combustion process is exhausted from the engine through an exhaust manifold 26. Although 4 cylinders are illustrated, it is appreciated that the present invention can be implemented in vehicles having any number of cylinders.

The drive torque is transferred through the torque converter 16 to drive the transmission 14. The transmission 14 multiplies the drive torque by a desired gear ratio to provide a modified drive torque. The modified drive torque is transferred to a vehicle driveline (not shown) by a transmission output shaft 28. The transmission 14 can includes an automatic transmission that is automatically shifted based on a vehicle speed ($V_{VEH}$) and a throttle position, as discussed in further detail below.

A control module 30 regulates operation of the powertrain based on vehicle operating parameters. More specifically, the control module 30 regulates a throttle opening or throttle position (TPS) corresponding to an effective throttle area ($A_{EFF}$) via a throttle actuator 32. A throttle position sensor 34 generates a throttle position signal based on the angular position of the throttle 20. The control module 30 regulates operation of the transmission 14 based on vehicle operating parameters. More specifically, a crankshaft position sensor 36 generates a crankshaft position signal, which is used to determine an actual engine speed ($RPM_{ENG}$).

Figure 2:
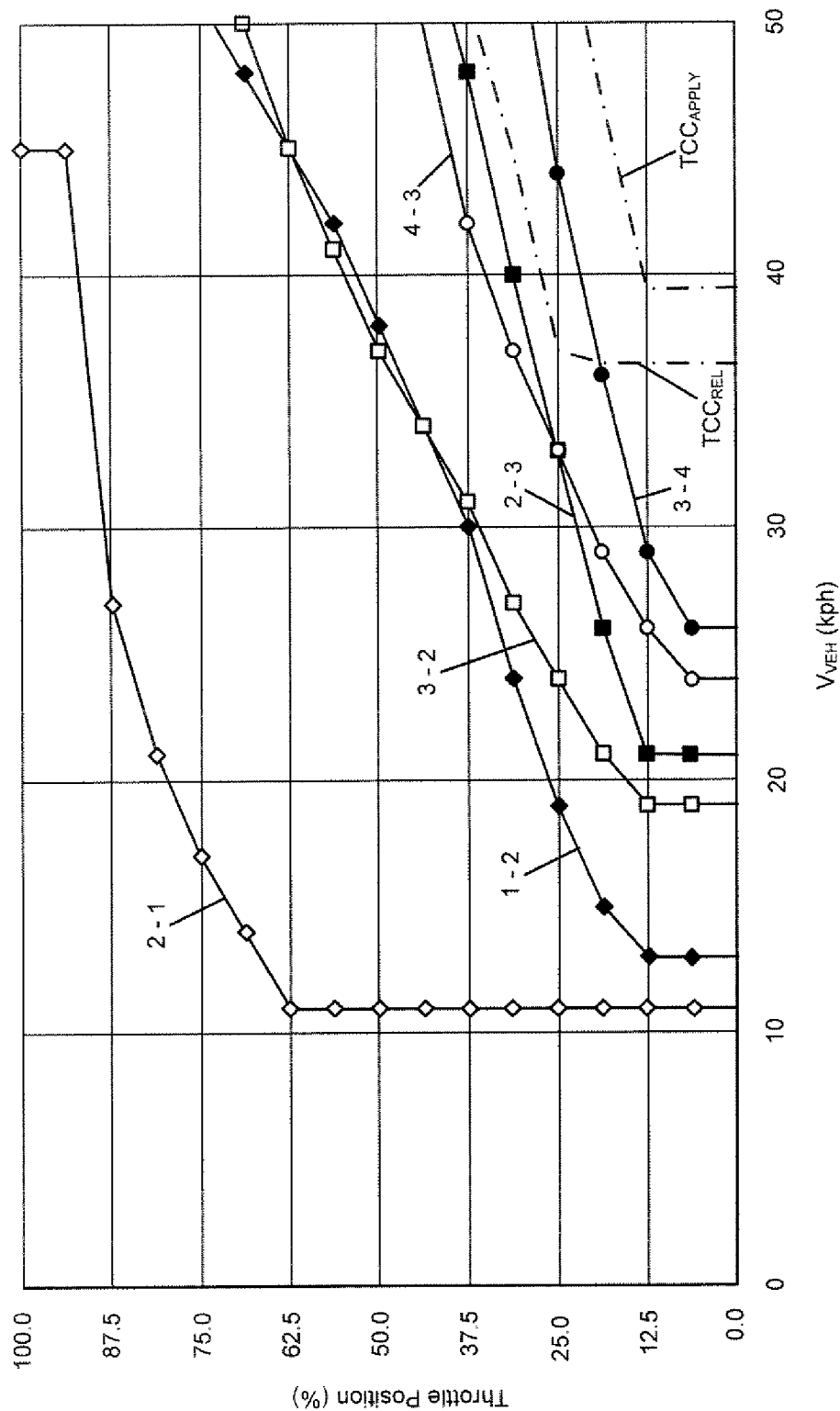
FIG. 2 is a graph illustrating exemplary shift lines for an exemplary automatic transmission.

Referring now to FIG. 2, the control module 30 adjusts a gear ratio of the transmission 14 based on the throttle position (i.e., TPS) and $V_{VEH}$. More specifically, the control module 30 includes a plurality of pre-programmed upshift and downshift lines based on $V_{VEH}$ and TPS, which is measured as a percentage of throttle opening. When the TPS and/or $V_{VEH}$ cross one of the shift lines, the control module 30 commands a corresponding shift. In the exemplary graph of FIG. 2, upshift and downshift lines are provided for an exemplary 4-speed automatic transmission. The exemplary downshift lines include 2-1, 3-2 and 4-3 downshift lines. The exemplary upshift lines include 1-2, 2-3 and 3-4 upshift lines. The lines also include torque converter clutch (TCC) apply and release lines. For example, if the $V_{VEH}$ is 20 kilometers per hour (kph) and the TPS is 25%, the automatic transmission is in $2^{nd}$ gear. If $V_{VEH}$ decreases past the 2-1 downshift line, while the %Throttle decreases or remains constant, a downshift from $2^{nd}$ gear to $1^{st}$ gear is commanded. Similarly, if $V_{VEH}$ increase past the 2-3 upshift line, an upshift from $2^{nd}$ gear to $3^{rd}$ gear is commanded.

Figure 3:
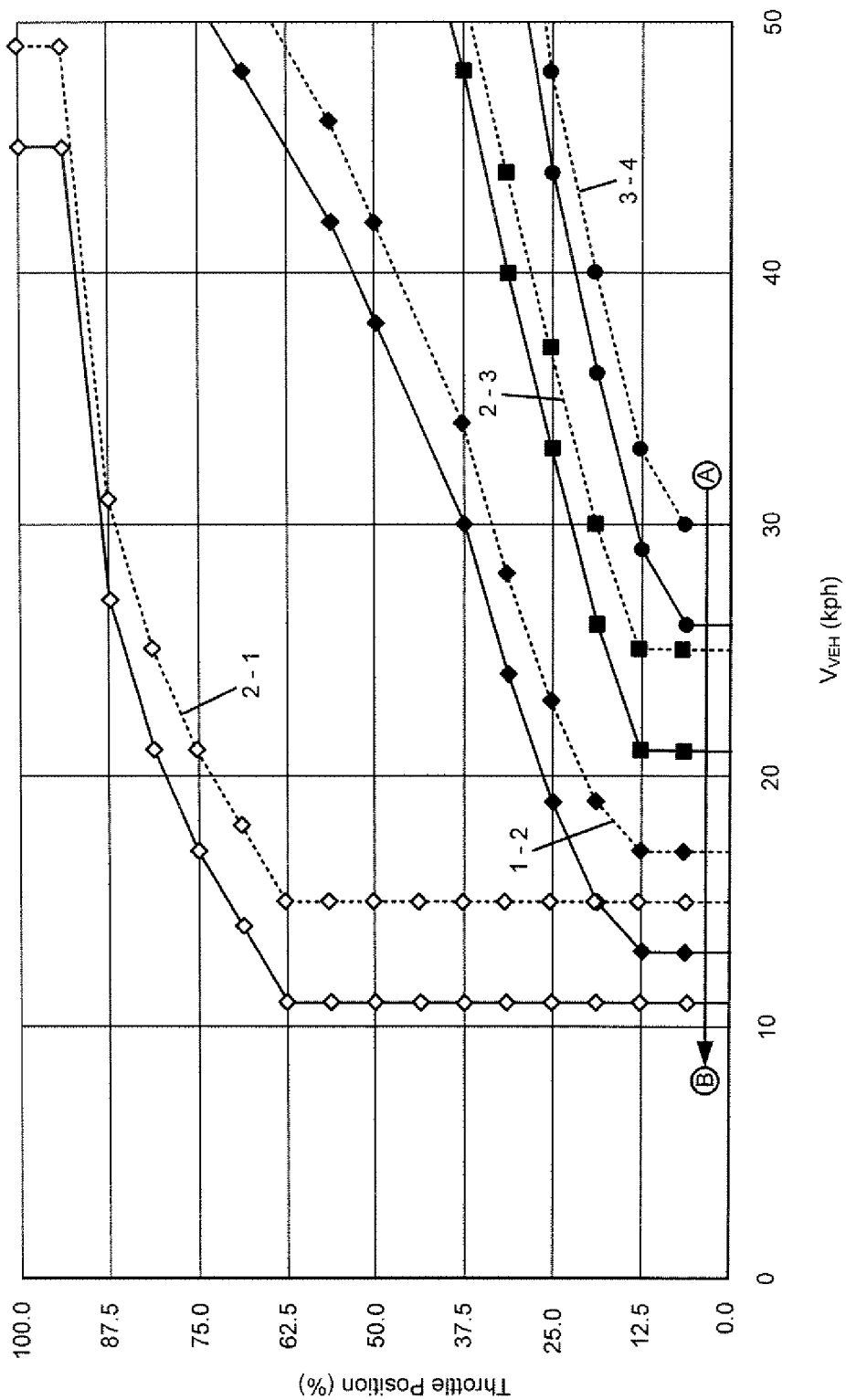
FIG. 3-5 are graphs illustrating the exemplary shift lines of FIG. 2 including exemplary offset shift lines in accordance with the deceleration dependent shift control of the present invention, and exemplary vehicles maneuvers executed during an offset mode.

Referring now to FIG. 3, the deceleration dependent shift control of the present invention temporarily offsets the shift lines based on a deceleration of the vehicle (i.e., $V_{VEH}$). More specifically, the acceleration of the vehicle ($a_{VEH}$) is determined based on the transmission output shaft signal (TOSS) and is continuously monitored. If $a_{VEH}$ is negative, the vehicle is deemed to be decelerating. Furthermore, if $a_{VEH}$ is less than a threshold acceleration ($a_{THR}$) (i.e., is more negative than $a_{THR}$), the deceleration dependent shift control enters an offset mode and offsets the downshift and upshift lines (see phantom lines). For example, at point A of FIG. 3, $V_{VEH}$ is approximately 32 kph and the transmission is in $4^{th}$ gear. The vehicle is rapidly decelerated towards point B. In response to the rapid deceleration, the shift lines are offset. It should be noted that although only a single offset downshift line is illustrated, it is anticipated that all of the upshift and downshift lines are offset.

The offset amount can be a predetermined, fixed value (e.g., 4 kph) or can be determined based on $a_{VEH}$ and/or the current gear. For example, if the deceleration is very rapid, the offset is greater than if the deceleration is slower. Alternatively or additionally, the offset can be based on the current gear ratio. For example, the offset is greater if the vehicle is decelerating and the transmission is in a higher gear than if the transmission is in a lower gear.

Figure 4:
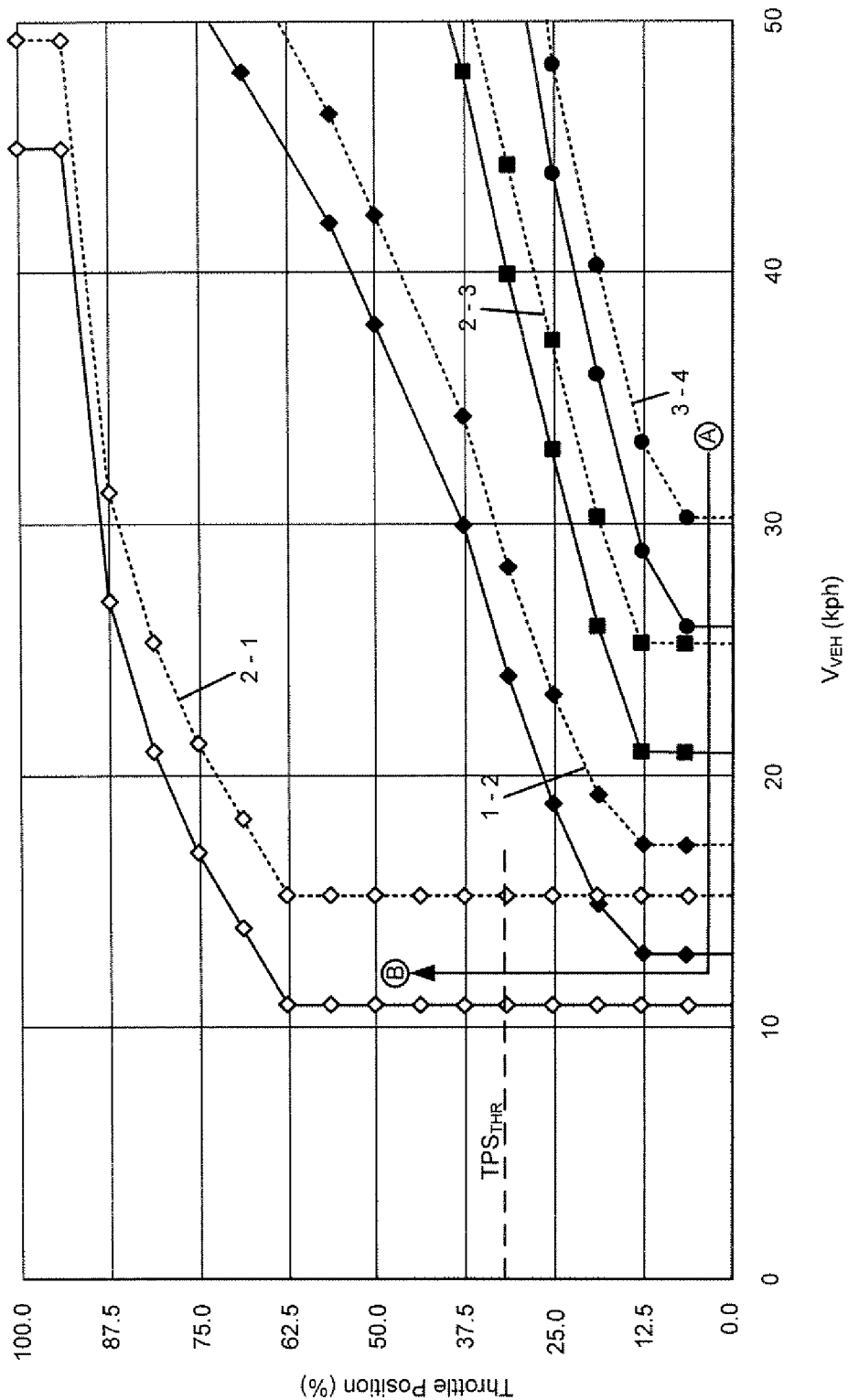

Upon entering the offset mode, the deceleration shift control stores the original or base downshift line (e.g., 2-1) and an offset timer $t_{OFFSET}$ is initiated. The offset mode can be exited upon $t_{OFFSET}$ achieving a threshold time ($t_{THR}$) (e.g., 5 seconds), upon TPS exceeding a TPS threshold ($TPS_{THR}$) or upon $V_{VEH}$ falling below the base downshift line (e.g., the original 2-1 downshift line). For example, as $V_{VEH}$ moves towards point B in FIG. 3, and crosses the base 2-1 downshift line, the offset mode is exited and all of the offsets are set equal to zero (i.e., all of the upshift and downshift lines go back to normal). With particular reference to FIG. 4, the offset mode is exited upon TPS exceeding $TPS_{THR}$, even though the base 2-1 downshift line is not crossed.

Figure 5:
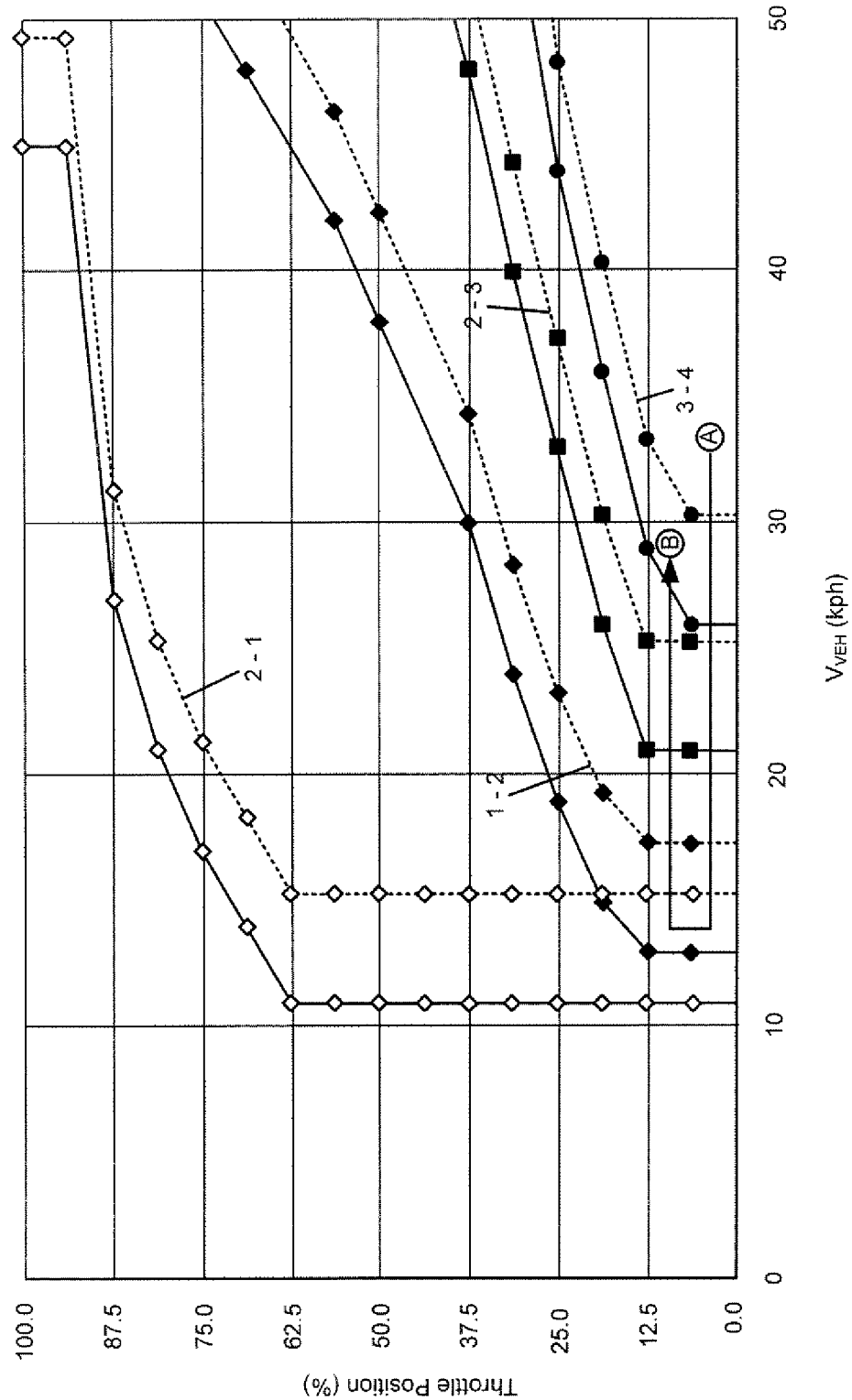

Referring now to FIG. 5, the offset can decay to zero over time if there is a sudden reversal in $a_{VEH}$ and $V_{VEH}$ increases. In the exemplary maneuver illustrated in FIG. 5, $a_{VEH}$ is sufficient to enter the offset mode, however, after $V_{VEH}$ crosses the offset 2-1 downshift line and downshifts to $1^{st}$ gear, $V_{VEH}$ suddenly increases. As $V_{VEH}$ moves towards the offset upshift lines, the offset value decays. In other words, as $V_{VEH}$ moves towards the offset upshift lines, the offset value decays so that the offset upshift lines are effectively moving toward $V_{VEH}$. For example, an upshift from $1^{st}$ to $2^{nd}$ gear is commanded at the fully offset 1-2 upshift line (e.g., offset by 4 kph). An upshift from $2^{nd}$ to $3^{rd}$ gear is commanded at the less than fully offset 2-3 upshift line (e.g., the offset has decayed to less than 4 kph). The offset continues to decay at a predetermined decay rate until the offset is 0 kph. It is anticipated that the decay rate can be a predetermined fixed amount or can be determined based on $a_{VEH}$ as $V_{VEH}$ accelerates back through the upshift lines.

Figure 6:
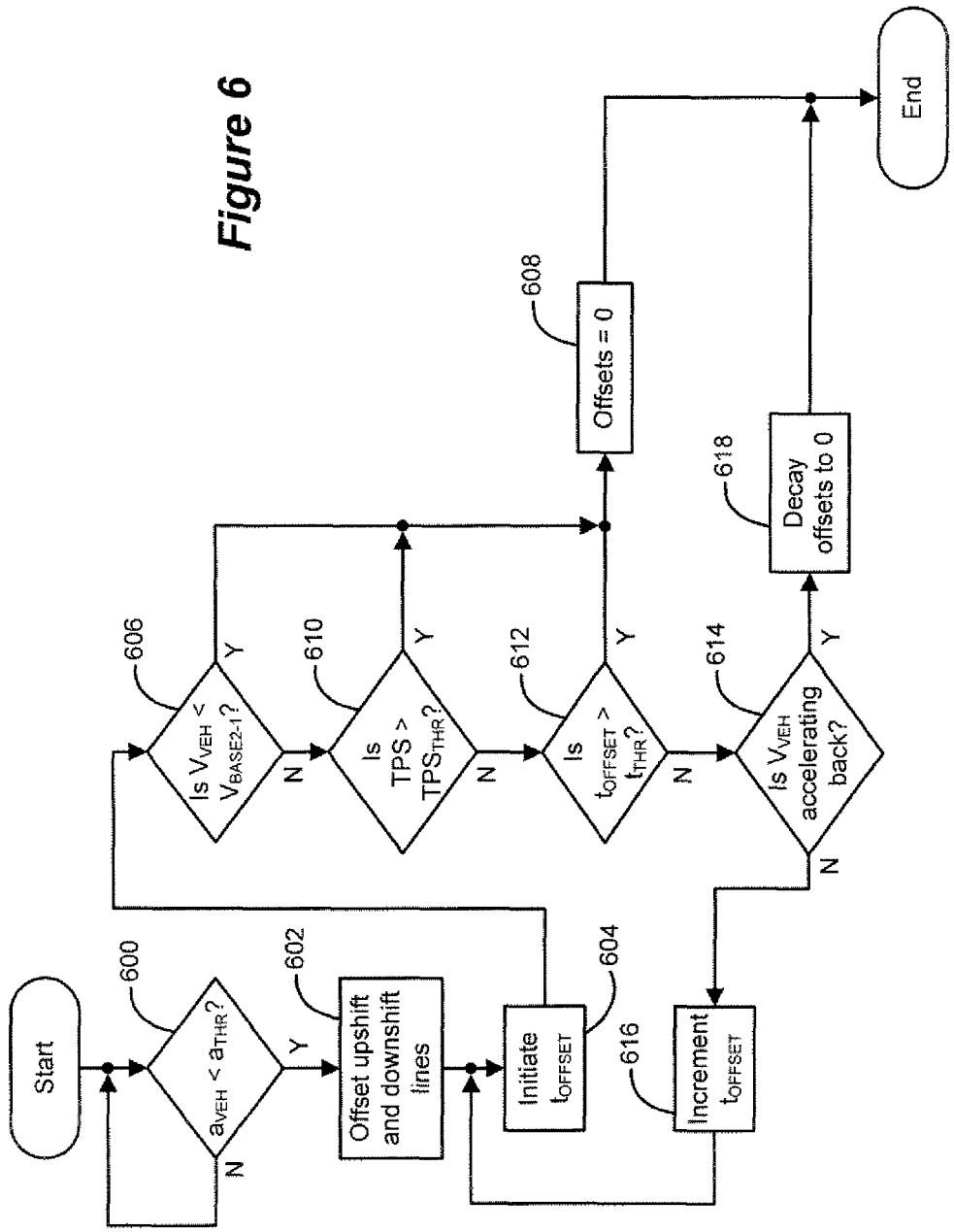
FIG. 6 is a flowchart illustrating exemplary steps executed by the overspeed protection control of the present invention.

Referring now to FIG. 6, exemplary steps executed by the deceleration dependent shift control will be described in detail. In step 600, control determines whether $a_{VEH}$ is less than an acceleration threshold ($a_{THR}$). If $a_{VEH}$ is less than $a_{THR}$, the vehicle is sufficiently decelerating to enter the offset mode, and control continues in step 602. If $a_{VEH}$ is not less than $a_{THR}$, the vehicle is not sufficiently decelerating to enter the offset mode, and control loops back. In step 602, control enters the offset mode and offsets the upshift and downshift lines. As discussed in detail above, the shift lines can be offset by a fixed amount, or the offset amount can be determined based on the current gear ratio and/or $a_{VEH}$. Control initiates $t_{OFFSET}$ in step 604.

In step 606, control determines whether $V_{VEH}$ has crossed the original or base 2-1 downshift line ($V_{BASE2-1}$). If $V_{VEH}$ has crossed $V_{BASE2-1}$, control continues in step 608. If $V_{VEH}$ has not crossed $V_{BASE2-1}$, control determines whether TPS is greater than $TPS_{THR}$ in step 610. If TPS is greater than $TPS_{THR}$, control continues in step 608. If TPS is not greater than $TPS_{THR}$, control determines whether $t_{OFFSET}$ is greater than $t_{THR}$ in step 612. If $t_{OFFSET}$ is greater than $t_{THR}$, control continues in step 608. If $t_{OFFSET}$ is not greater than $t_{THR}$, control continues in step 614. In step 608, control exits the offset mode by setting the offsets to zero, and control ends.

In step 614, control determines whether $V_{VEH}$ is accelerating back through the upshift lines (see FIG. 5). If $V_{VEH}$ is not accelerating back through the upshift lines, control increments $t_{OFFSET}$ in step 616 and loops back to step 604. If $V_{VEH}$ is accelerating back through the upshift lines, control exits the offset mode by decaying the offsets to zero at a predetermined decay rate, and control ends. As discussed above, the decay rate and be a fixed amount or can be determined based on $a_{VEH}$ as the vehicle accelerates.

Figure 7:
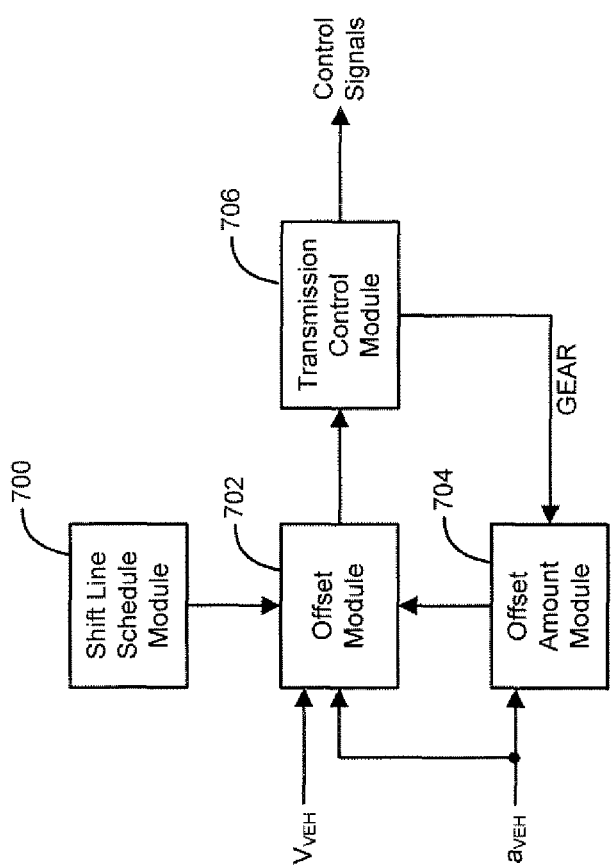
FIG. 7 is a functional block diagram of exemplary modules that execute the overspeed protection control of the present invention.

Referring now to FIG. 7, exemplary modules that execute the deceleration dependent shift control will be described in detail. The exemplary modules include a shift line schedule module 700, an offset module 702, an offset amount module 704 and a transmission control module 706. The shift line schedule module 700 includes the predetermined or normal shift lines. The offset module 702 offsets the shift lines based on inputs from the various modules and provides the offset shift line information to the transmission control module 706, which regulates operation of the transmission. The offset amount module 704 determines the offset value based on $a_{VEH}$ and the current gear, which is provided by the transmission control module 706.

The deceleration dependent shift control of the present invention inhibits driveline disturbances during rapid vehicle deceleration, by executing transmission downshifts earlier in the deceleration. In this manner, the deceleration event does not occur concurrently with other vehicle events (e.g., axle wind, suspension dynamic events and the like). Other advantages of the deceleration dependent shift control are that it is functional for any gear ratio, and that there are various exit criteria, providing improved flexibility in implementing the control.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A transmission control system for regulating operation of an automatic transmission of a vehicle, comprising:
   a first module that provides a predetermined shift schedule including upshift and downshift lines;
   a second module that offsets each of said upshift and downshift lines by an offset amount concurrently to provide modified upshift and downshift lines when a deceleration of said vehicle exceeds a threshold deceleration; and
   a third module that regulates operation of said automatic transmission based on said modified upshift and downshift lines.

2. The transmission control system of claim 1 further comprising a fourth module that determines said offset amount based on at least one of a current gear ratio of said automatic transmission and said deceleration.

3. The transmission control system of claim 1 wherein said offset amount is a fixed, predetermined amount.

4. The transmission control system of claim 1 wherein said second module stores a base downshift line vehicle speed, and sets said offset amount to zero when a current vehicle speed falls below said base downshift line vehicle speed.

5. The transmission control system of claim 1 wherein said second module initiates a timer upon executing said step of offsetting, and sets said offset amount to zero when said timer achieves a threshold time.

6. The transmission control system of claim 1 wherein said second module sets said offset amount to zero when a throttle position exceeds a threshold throttle position.

7. The transmission control system of claim 1 wherein said second module monitors a vehicle speed, and decays said offset amount towards zero when said vehicle speed accelerates back through said upshift lines.

8. The transmission control system of claim 7 wherein said second module decays said offset amount based on a decay rate.

9. The transmission control system of claim 8 wherein said decay rate is a predetermined, fixed value.

10. The transmission control system of claim 8 wherein said decay rate is determined based on an acceleration of said vehicle.

11. A method of regulating operation of an automatic transmission of a vehicle, comprising:
    providing a predetermined shift schedule including upshift and downshift lines;
    offsetting each of said upshift and downshift lines by an offset amount concurrently to provide modified upshift and downshift lines when a deceleration rate of said vehicle exceeds a threshold deceleration rate; and
    regulating operation of said automatic transmission based on said modified upshift and downshift lines.

12. The method of claim 11 further comprising determining said offset amount based on at least one of a current gear ratio of said automatic transmission and said deceleration rate.

13. The method of claim 11 wherein said offset amount is a fixed, predetermined amount.

14. The method of claim 11 further comprising:
    storing a base downshift line vehicle speed; and
    setting said offset amount to zero when a current vehicle speed falls below said base downshift line vehicle speed.

15. The method of claim 11 further comprising:
    initiating a timer upon executing said step of offsetting; and
    setting said offset amount to zero when said timer achieves a threshold time.

16. The method of claim 11 further comprising setting said offset amount to zero when a throttle position exceeds a threshold throttle position.

17. The method of claim 11 further comprising:
    monitoring a vehicle speed; and
    decaying said offset amount towards zero when said vehicle speed accelerates through said upshift lines.

18. The method of claim 17 wherein said decaying is achieved based on a decay rate.

19. The method of claim 18 wherein said decay rate is a predetermined, fixed value.

20. The method of claim 18 wherein said decay rate is determined based on an acceleration of said vehicle.

* * * * *